United States Patent [19]

Hegarty et al.

[11] Patent Number: 4,475,347
[45] Date of Patent: Oct. 9, 1984

[54] PROCESS FOR SEPARATING CARBON DIOXIDE AND SULFUR-CONTAINING GASES FROM A SYNTHETIC FUEL PRODUCTION PROCESS OFF-GAS

[75] Inventors: William P. Hegarty, Wescosville; William P. Schmidt, Allentown, both of Pa.

[73] Assignee: Air Products and Chemicals, Inc., Allentown, Pa.

[21] Appl. No.: 418,517

[22] Filed: Sep. 16, 1982

[51] Int. Cl.³ .................................................. F25J 3/04
[52] U.S. Cl. .............................................. 62/17; 55/68; 55/73; 62/20; 62/39
[58] Field of Search ................... 62/17, 20, 38, 39; 55/68, 73, 89

[56] References Cited

U.S. PATENT DOCUMENTS

| | | | |
|---|---|---|---|
| 2,886,405 | 5/1959 | Benson et al. | 23/3 |
| 3,130,026 | 4/1964 | Becker | 62/17 |
| 4,014,575 | 3/1977 | French et al. | 299/2 |
| 4,117,886 | 10/1978 | Honaker | 166/259 |
| 4,158,467 | 6/1979 | Larson et al. | 299/2 |
| 4,169,133 | 9/1979 | Staege | 423/437 |
| 4,169,506 | 10/1979 | Berry | 166/256 |
| 4,270,937 | 6/1981 | Adler et al. | 62/17 |
| 4,305,733 | 12/1981 | Scholz et al. | 62/17 |

*Primary Examiner*—Frank Sever
*Attorney, Agent, or Firm*—Geoffrey L. Chase; E. Eugene Innis; James C. Simmons

[57] ABSTRACT

A process is described for the separation of an off-gas from a synthetic fuels production process, such as oil shale retorting, coal gasification, oxygen fireflooding or carbon dioxide miscible flood enhanced oil recovery, into an essentially sulfur-free, light fuel gas and a sulfur containing carbon dioxide gas. The off-gas is contacted with methanol to remove the sulfur containing gases and is then cooled to separate out a light fuel gas from a predominantly carbon dioxide gas. The carbon dioxide gas is again contacted with the same methanol to scrub the latter of sulfur-containing gas and reabsorb the sulfur onto the carbon dioxide gas. The carbon dioxide gas can then be recycled to the synthetic fuels production process with deposition of the sulfur therein or the gas can be delivered for export with downstream sulfur treatment.

17 Claims, 2 Drawing Figures

PROCESS FOR SEPARATING CARBON DIOXIDE AND SULFUR-CONTAINING GASES FROM A SYNTHETIC FUEL PRODUCTION PROCESS OFF-GAS

TECHNICAL FIELD

The present invention relates to the field of separating various gas components from the off-gas of a synthetic fuel production process or non-primary recovery processes, such as oxygen fireflooding and enhanced oil recovery. The process of the present invention is more specifically related to the separation of a carbon dioxide and sulfur-containing gas stream from an off-gas, while also separating a light fuel gas from said off-gas. Relevant off-gas streams which can be used as the feed for the present invention include those off-gases containing a major portion of carbon dioxide and lesser portions of sulfur-containing gases and higher hydrocarbons. The present invention is particularly relevant to the recycling of the carbon dioxide and sulfur-containing gas to one of the enumerated processes mentioned above, such as synthetic fuel production processes, as well as the export of carbon dioxide gas for use in enhanced oil recovery processes.

BACKGROUND OF THE PRIOR ART

As the general decline in traditional energy resources has been experienced by industry, as well as the consuming public, a switch to the conversion of less desirable energy resources and the production of synthetic fuels and gases have occurred. Various processes which have been known in the prior art, but have not been practiced on a commercial scale because of previous unfavorable economics, are now beginning to be of interest to the energy industry as potential viable sources of consumable energy which can replace dwindling petroleum reserves. Such synthetic fuel production processes include oil shale retorting, coal gasification, and oxygen fireflooding. In addition, as easily recoverable petroleum reserves are used up, secondary and tertiary recovery systems for residual petroleum reserves are being utilized such as enhanced oil recovery using pressurized carbon dioxide gas.

Many of the synthetic fuel production processes as well as secondary and tertiary recovery operations utilize large quantities of inert gas as moderators, diluents and pressure maintaining phases. Various gases have been utilized for such processes including nitrogen and carbon dioxide.

In oil shale retorting, both surface and in-situ, a moderating gas is essential to the controlled combustion of the oil shale mineral. Oil shale is a sedimentary geologic mineral formation generally found in the western states of the United States. Oil shale contains a hydrocarbonaceous component which is called kerogen. In oil shale retorting, the object is to heat the kerogen until it is volatilized for successful removal as a synthetic fuel consisting of a gas phase and a liquid phase. During retorting, an oxidant gas and a moderating gas are forced through the retorting oil shale in order to burn a small percentage of the kerogen to provide heat for the volatilization of the remainder of the kerogen for recovery as a fuel. As combustion occurs in the retorting of oil shale, large quantities of carbon dioxide off-gases are formed which contain hydrocarbons and sulfur-containing gases. A problem exists in the disposal of these off-gases both to avoid environmental problems with sulfur components and to improve the economics of the presently very expensive oil shale retorting operation.

In another synthetic fuel production process, coal gasification, moderators are typically required for inclusion with the coal combusting oxidant gas. Steam has generally been utilized as a coal gasification moderator. Carbon dioxide has been considered as an alternate moderator. Again, in coal gasification the off-gas from the process includes fuel components as well as non-fuel components comprising carbon dioxide and sulfur-containing gases. In order to meet environmental and economic goals, these gases must be utilized or processed for disposal or further use.

In oxygen fireflooding, an oxidant gas is used to combust a petroleum formation in-situ. Such formations in which oxygen fireflooding is utilized generally do not naturally produce due to the lack of natural in-situ pressure, high viscosity of the petroleum in the formation or unfavorable formation structure. An oxidant gas is pumped into the petroleum formation in an injection well to spontaneously combust the formation or to sustain an artificially initiated combustion. Such combustion heats the petroleum and lowers its viscosity which allows the petroleum to be recovered from a producing well which is used in tandem with the injection well. During the petroleum combustion, a significant amount of carbon dioxide is produced and recovered with the produced petroleum. Again, this process would benefit economically from the utilization of the significant carbon dioxide by-product of the petroleum recovery in oxygen fireflooding.

In carbon dioxide miscible flood enhanced oil recovery operations, high pressure carbon dioxide is injected into a partially depleted oil reservoir. The carbon dioxide serves to extract and displace the residual oil to a production well that discharges carbon dioxide and recovered oil to the surface at reduced pressure. The oil product liquid phase is separated from the carbon dioxide and the hydrocarbon gas phase. The gas can be processed to recover the oil from the by-product gases. Again, the economics of the recovery process would benefit from the utilization of the carbon dioxide-containing gas phase.

In the above-identified synthetic fuel production processes, each process would benefit from the further utilization of carbon dioxide, which is a significant by-product, by either recycling the carbon dioxide with the sulfur-containing gases as a diluent for the combustion process or for the recovery of the carbon dioxide for use at off-site locations such as pipelining to enhanced oil recovery operations.

Various prior art processes have been developed for the recycling of such off-gases from synthetic fuel production processes, such as coal gasification and oil shale retorting, as well as recovery operations, such as oxygen fireflooding and enhanced oil recovery operations. These prior art processes generally suffer from high energy consumption and a complexity of process apparatus which requires high capital expenditure.

U.S. Pat. No. 2,886,405 discloses a process for the separation of carbon dioxide and hydrogen sulfide from gas mixtures utilizing a chemical absorbent solvent such as hot potassium carbonate. As is typical in chemical solvents, the enriched solvent is regenerated by a boiling and steam stripping operation which is energy intensive.

U.S. Pat. No. 4,014,575 describes a process for the recycling of off-gases from oil shale retorting through spent oil shale beds in order to deposit the sulfur compounds from the off-gas onto the particles of the oil shale bed. This can be done in conjunction with the water scrubbing of the off-gases in a Venturi scrubber.

In U.S. Pat. No. 4,117,886, a method is disclosed which utilizes the scrubbing of off-gases from oil shale retorting with water containing basic components. The acid-containing off-gas from an operating oil shale retort is contacted with this basic component-containing water. The basic pH water neutralizes the acid off-gases and the latter can be recycled for retorting or burned if sufficient BTU energy can be derived.

In U.S. Pat. No. 4,158,467, a process for the recycling of oil shale retort off-gases is disclosed wherein the hot potassium carbonate solvent of U.S. Pat. No. 2,886,405, mentioned above, is utilized. As stated before, the utilization of chemical absorbent solvents in such an operation is energy intensive due to the complexity of regenerating such solvents for reuse. Additionally, the chemical absorption process is essentially nonselective between sulfur compounds and carbon dioxide.

The removal of acid gas components from gas streams is set forth in U.S. Pat. No. 4,169,133 wherein carbon dioxide acid gas components are frozen out of a main gas stream. A process wherein a solid product is produced from a gas clean-up operation is not conducive to recycling or continuous operation.

In U.S. Pat. No. 4,169,506, the scrubbing of offgases from in-situ retorting of oil shale is set forth. The scrubbing utilizes caustic soda in conjunction with a deoiling process. In this instance, the scrubbed sulfur components are passed to a claus plant for refinement to elemental sulfur.

In U.S. Pat. No. 4,270,937, a process is disclosed for the separate removal of sulfides and carbon dioxide from a coal gasification gas stream. Externally supplied refrigeration is used to operate a complex solid/liquid absorbent stream in a process which operates on carbon dioxide streams containing 55% carbon dioxide.

The processes of the prior art for the disposal or recycle of carbon dioxide diluent gases to a synthetic fuel production process or for the utilization of such gas from an enhanced oil recovery operation have been deficient for several reasons, including; the energy intensive nature of the recovery operation, the regeneration requirements of chemical solvents, the necessity for large quantities of water, which in areas may not be available and the uneconomical separation and recycle of pressurizing gases for enhanced oil recovery operations. In addition, many of the prior art processes have failed to recover potential low BTU fuel components from the off-gases from such operations.

The present invention overcomes these disadvantages by providing a low energy, low temperature system for the recovery of carbon dioxide and acid gases for potential recycle or export, as well as the recovery of a low BTU fuel gas for export or plant use. The present invention achieves this recovery using a dual absorption column methanol scrub cycle.

With respect to oxygen fireflooding and enhanced oil recovery operations, the present invention can be used to extract and pipeline bulk carbon dioxide after additional sulfur removal or recycle of the carbon dioxide to the enhanced oil recovery operation from which it is produced.

BRIEF SUMMARY OF THE INVENTION

The present invention is directed to a process for separating an off-gas from a synthetic fuel production process, which gas contains carbon dioxide, sulfurcontaining gases and lower hydrocarbons, by separating the off-gas into an essentially sulfur-free, light fuel gas and a sulfur-containing carbon dioxide gas. The process comprises the steps of drying the feed gas by methanol injection and cooling to remove a water-containing liquid phase, contacting the dry off-gas with a second stream of methanol to remove essentially all of the sulfur-containing gases from the off-gas wherein the separation is performed in an absorption column in which the essentially sulfur-free off-gas is removed as an overhead stream from said column and the sulfurcontaining methanol is removed as a bottom stream from said column, subcooling the carbon dioxide overhead stream to separate an essentially sulfur-free light fuel gas and a predominently carbon dioxide-containing stream, expanding the carbon dioxide-containing stream to produce refrigeration for the subcooling of the overhead stream from the absorption column, and contacting said sulfur-containing methanol bottom stream from said absorber with the expanded carbon dioxide-containing stream in a stripper column to strip essentially all of the sulfur-containing gases from the methanol stream to reabsorb the same in the carbon dioxide stream such that essentially sulfur-free methanol is removed as a bottom stream for recycle to the upstream portion of the process and a sulfur-containing carbon dioxide stream is removed as an overhead stream from the stripper column for recycle to the synthetic fuel production process, a non-primary petroleum recovery process or for export.

Preferably, the separation process of the present invention utilizes auto-refrigeration wherein the refrigeration requirements for the separation is achieved by the expansion of the various process streams, most notably, the carbon dioxide-containing streams which are free of sulfur components and fuel components. This expansion and refrigeration is performed by expander valves and expander turbines in the flow stream of the respective process streams.

It is an advantage of the present invention wherein the sulfur-containing methanol stream from the bottom of the absorber column is expanded to cool the sulfur-containing carbon dioxide stream which is exported or recycled and to further cool the upper portion of the absorption column to enhance the refluxing action of that column.

It is a further advantage of the present invention to heat the water and methanol stream from the initial drying of the feed gas stream in order to remove residual carbon dioxide and to remove water as a waste stream so that the remaining water-free methanol can be recycled to the process with minimum makeup methanol required.

Alternately, the process of the present invention can process low pressure off-gas from a synthetic fuels production process wherein the gas is initially compressed and aftercooled generally in a staged compression step at which time water and heavy hydrocarbons are removed from the feed gas stream.

In the event that the feed gas stream to the process of the present invention contains heavy hydrocarbons such as $C_4$ and higher hydrocarbons, the process can utilize a lean oil stripping cycle which is downstream of initial compression and upstream of the methanol injection.

The advantage of the present invention is that it can be utilized in a number of synthetic fuel production processes as well as non-primary recovery of natural fuels. Processes of the former group include oil shale retorting and coal gasification. The processes of the latter group include oxygen fireflooding and carbon dioxide miscible flood enhanced oil recovery.

The present invention provides an inexpensive, low energy process for the recycle of carbon dioxide as a moderator or diluent and the recovery and deposition of sulfur contaminents from the off-gas of a fuel process to the solid residue of the process from which the off-gas was produced.

DETAILED DESCRIPTION OF THE INVENTION

Figure 1:
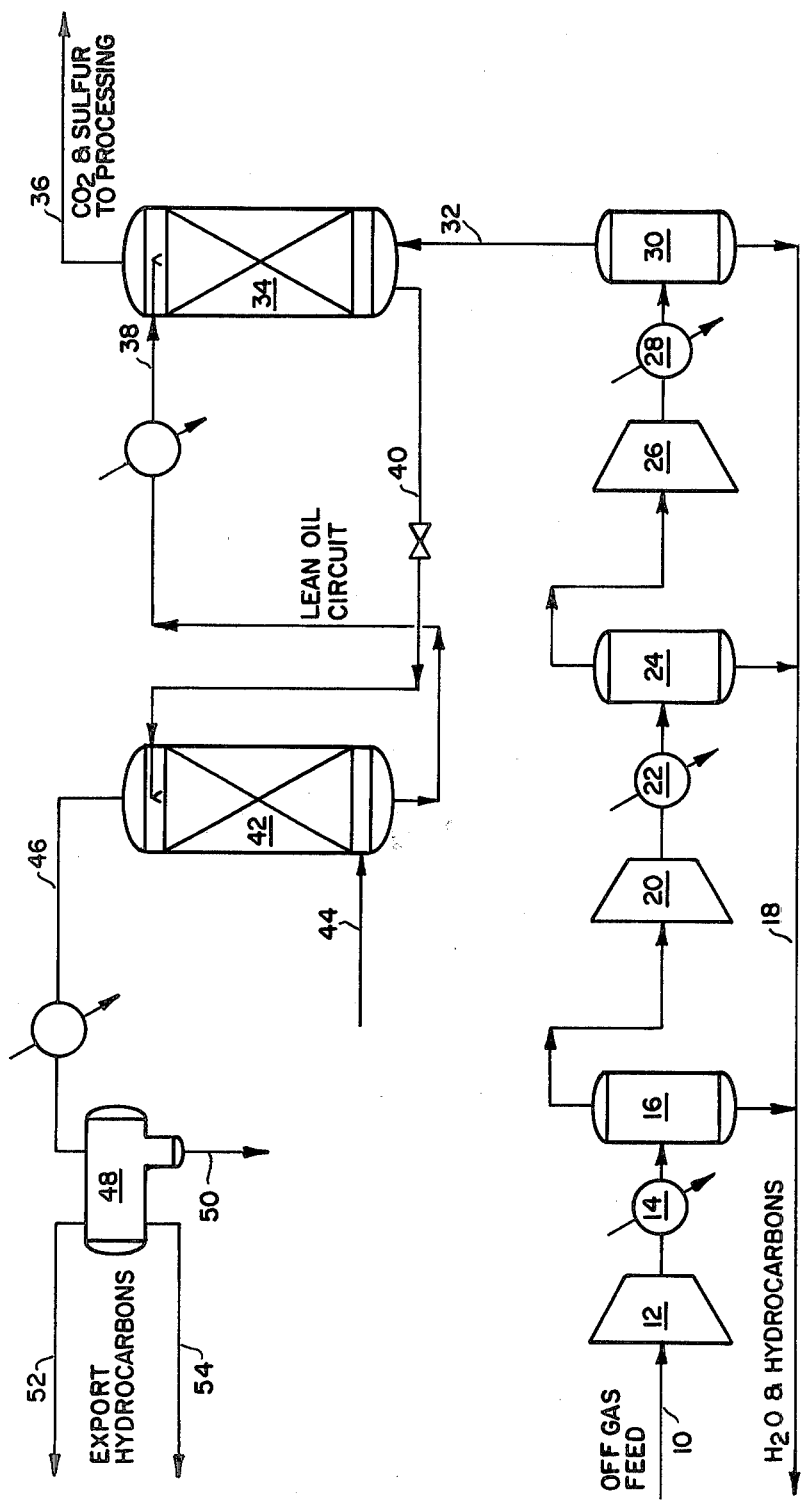
FIG. 1 is a flowsheet of a preliminary compression aftercooling and higher hydrocarbon removal process for pretreatment of some gas streams which are processed in the present invention.

The present process is relevant to the recycling or processing of carbon dioxide containing off-gases which are by-products of oil shale retorting, coal gasification, oxygen fireflooding and carbon dioxide miscible flood enhanced oil recovery. The former two processes involve combustion of a solid carbonaceous source to produce a fuel medium and the by-product gas. In the case of oil shale the solid carbonaceous source is kerogen. In the case of coal, the solid carbonaceous source is polynuclear aromatic ring compounds which make up the structure of the coal. In the latter two processes identified above, the by-product gases are recovered with the fuel product in petroleum formations which are not naturally producing because of high viscosities, surface tensions and the lack of natural pressure in the petroleum formation. In oxygen fireflooding the in-situ combustion of a petroleum formation produces a carbon dioxide by-product which is advantageously converted by the present invention into a marketable product, while the enhanced oil recovery process utilizes an inert gas such as carbon dioxide as a pressure maintenance medium and recovers the same which advantageously can benefit from the recycle potential of the present invention. In the combustion processes mentioned above, a moderator or diluent gas is needed in order to minimize the temperatures experienced in the fuel production process and in the case of oil shale retorting and oxygen fireflooding to reduce the amount of hydrocarbon resource which is combusted in order to remove a liquid fuel product. Complete combustion occurs in coal gasification, but a diluent gas is still required to avoid melting and slagging of the coal reactant. In oxygen fireflooding, it can be necessary to control the initial combustion when the burn-front within the oil holding formation is small, such that excessive oil burning does not occur and such that burn through from the injection well to the production well does not circumvent a patterned, controlled fire-front burn. Carbon dioxide as a diluent performs the function of controlling such a burn front. Carbon dioxide has also been known to be used as a pressurizing medium for the enhanced recovery of oil from in-situ geologic formations. The low energy, low capital separation process of the present invention allows for recycle of the pressurizing medium as it is recovered from the production well of an enhanced oil recovery process. The present invention is directed to the use of carbon dioxide as a diluent for these synthetic fuel production processes as well as a pressurizing medium in enhanced oil recovery. More particularly, the present invention is directed to the recovery of light fuel gas components from the off-gas of one of the above operations and the recovery of carbon dioxide and any sulfur contaminants from such a process with the potential for the recycle of the carbon dioxide as a diluent and the deposition of any sulfur contaminents in the formation or the mined mineral from which the off-gas and sulfur is evolved. In the case of oxygen fireflooding, after initial combustion, it may be necessary to further process the carbon dioxide product stream of the separation process to remove sulfur compounds in order to use the carbon dioxide in distant industrial utilities when it is not necessary for the oxygen fireflooding process. In the detailed description of the separation process of the present invention which follows, the source of the off-gas will be identified as a synthetic fuel production process, but this is understood to include the above-enumerated processes which include non-primary recovery of natural fuel resources, such as oxygen fireflooding and enhanced petroleum or oil recovery processes.

With reference to FIG. 1, the feed off-gas from a synthetic fuel production process which is to be separated in the present invention in some instances requires additional compression if the off-gas is at low pressure and additionally may require the removal of higher hydrocarbons such as $C_4$ and heavier hydrocarbons. The flow scheme in FIG. 1 can be utilized in such cases. The low pressure off-gas feed is introduced into the pretreatment system in line 10 where it is initially compressed in compressor 12 and aftercooled in a cold water heat exchanger 14. Some water and hydrocarbons can be condensed out at this time and are separated in a phase separator vessel 16 wherein the water and hydrocarbons are removed to an effluent line 18. The feed gas continues through two stages of compression, aftercooling and phase separation in compressor 20, aftercooler 22, phase separator 24 and compressor 26, aftercooler 28 and phase separator 30. At this point, the pressurized feed off-gas may still contain hydrocarbons such as butane and higher hydrocarbons. In such case, the off-gas is subjected to a lean oil stripping cycle which is set to remove such hydrocarbons from the off-gas, but is not designed to remove lower hydrocarbons such as propane, ethane and methane. Such a lean oil stripping cycle is well known in the prior art and it is not deemed necessary to provide a detailed disclosure of such a cycle at this time. However briefly, a lean oil such as kerosene or a gas-oil fraction boiling at 400°–600° F., is delivered countercurrently in a gas-liquid contact column 34 where the off-gas is delivered in an upflow manner. The lean oil or kerosene absorbs the relevant hydrocarbons and is removed from the bottom of the column 34 in line 40. The hydrocarbon-rich oil in line 40 is then introduced into a column 42 in which the hydrocarbon-rich oil is stripped by high temperature, reduced pressure and steam introduced through line 44. Lean oil, containing substantially no additional hydrocarbons is then recycled with cooling in line 38 back to the contact column 34. The stripped hydrocarbons are removed as an overhead from column 42 in line 46 and cooled by cold water in order to separate three phases consisting of water which is removed in line 50, liquid hydrocarbons which are removed in line 54 and gaseous hydrocarbons which are removed in line 52. These hydrocarbons are available for export as a product, while the water may be recycled for steam production for the continuous cycling of the lean oil stripping cycle. The hydrocarbon stripped off-gas is removed from the optional processing of FIG. 1 in line 36 and supplied as feed to the main process of the present invention as shown in FIG. 2.

Figure 2:
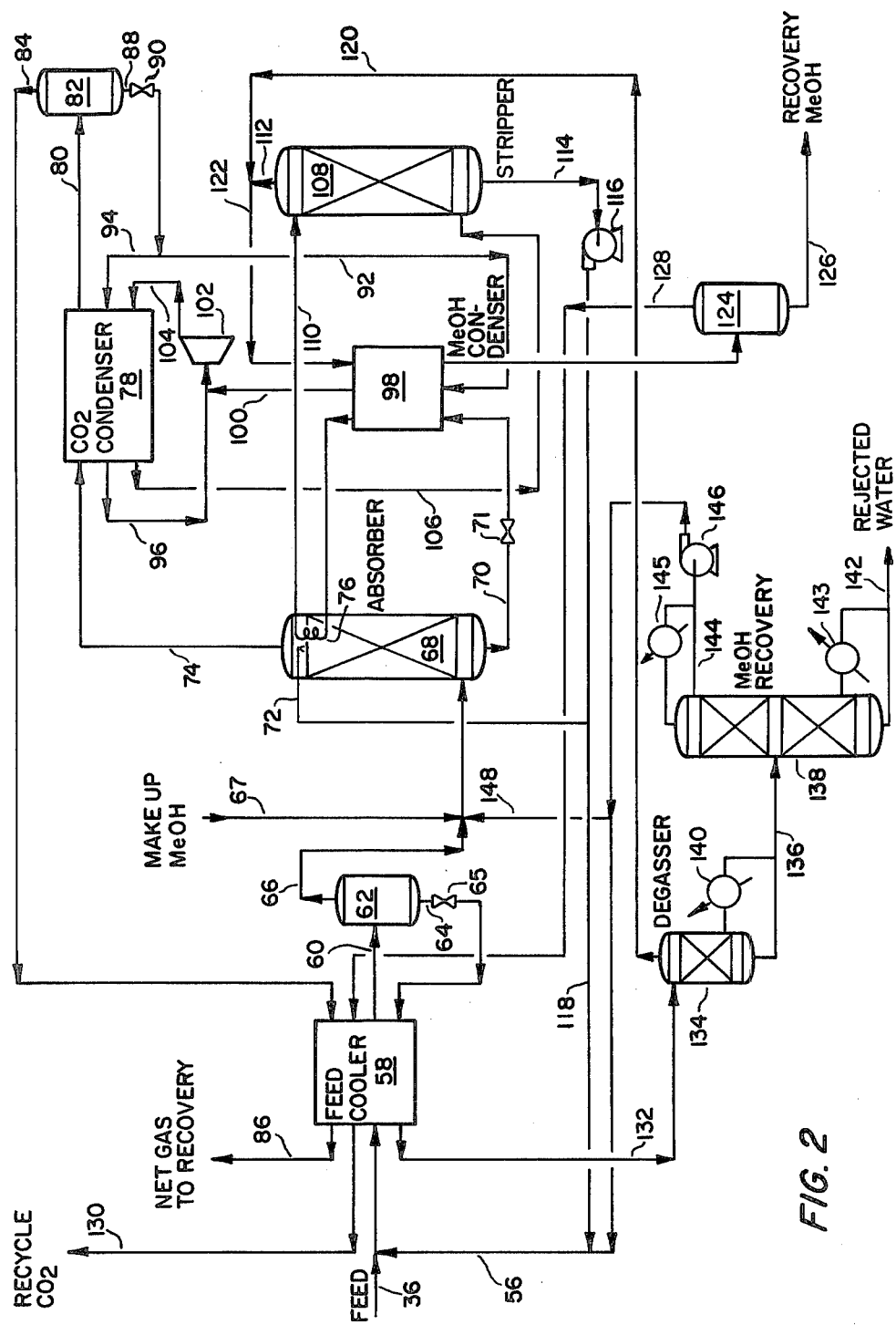
FIG. 2 is a flowscheme for the preferred embodiment of the present invention which can be utilized singularly or in conjunction with the pretreatment shown in FIG. 1.

With reference to FIG. 2, the separation process of the present invention is set forth in which an off-gas from a synthetic fuel production process is supplied as feed in line 36. As stated above, in the event that the off-gas is already at relatively high pressure then the feed can be processed directly in the system shown in FIG. 2. In the event that the feed is at low pressure, the pretreatment shown in FIG. 1 is necessary before the feed is introduced into the main process system in line 36. This pressure determination is dependent on the carbon dioxide content of the feed. Higher carbon dioxide contents require less overall pressure for successful processing. This relationship is shown in Table 1 where the minimum pressures for a given feed gas are set forth.

TABLE 1

| Minimum Feed Pressure | Minimum $CO_2$ Content |
|---|---|
| 125 psia | 93% |
| 150 | 82% |
| 200 | 65% |
| 300 | 43% |
| 400 | 33% |

Typically the off-gas feed from a synthetic fuel production process will have a high carbon dioxide content with lesser amounts of carbon monoxide, hydrogen, sulfides, such as carbonyl sulfide and hydrogen sulfide, water and lower hydrocarbons, such as methane, ethane and propane. An exemplary off-gas feed stream consists of the following composition:

TABLE 2

| $CO_2$ | 90.4% |
|---|---|
| CO | 4.3% |
| $H_2$ | 2.5% |
| $CH_4$ | 1.1% |
| $C_2H_6$ | 0.8% |
| $S_x$ | 0.3% |
| $H_2O$ | 0.6% |

The feed off-gas introduced in line 36 has a flow rate of 601 CFM. The off-gas is at a pressure of 160 psia and a temperature of 100° F. Because the feed off-gas contains residual water, a small amount of methanol is introduced into the feed in line 36 by means of a methanol recycle drying line 56. The methanol acts as an antifreeze to prevent the solid deposition of the contained water in subsequent cooling operations. The methanol-containing feed off-gas is then cooled in feed heat exchanger 58 against various process streams. The cooled feed stream is phase separated in phase separator vessel 62, wherein methanol and water are removed as a liquid bottom phase in line 64 and the essentially dry and methanol-free off-gas is removed as a vapor phase in line 66. A second contact of methanol with the feed stream in line 66 is performed by the introduction of a recycled slipstream of methanol in line 148, as well as the introduction of make-up and recycle methanol in line 67. This injection of methanol into the feed gas is utilized to recycle methanol and make up for losses occurring elsewhere in the system. The methanol-containing feed gas is introduced into the base of an absorber column 68. Additional methanol in line 72 is sprayed over the incoming feed gas stream by a spray head attached to line 72 at the top of absorber column 68. This combined methanol contact feed gas is designed to absorb sulfur-containing gas components from the feed gas in order to remove a methanol-sulfur stream from the bottom of the absorber column 68 in line 70 while removing a sulfur-free carbon dioxide-containing off-gas as an overhead stream in line 74. The upper portion of the column is additionally cooled by the expanded methanol and sulfur stream which is heat exchanged in methanol cooling coils 76 in the top of the absorber column 68.

The sulfur-free carbon dioxide and light fuel gas in the overhead stream in line 74 is cooled with partial condensation in the carbon dioxide heat exchanger 78 against expanded carbon dioxide process streams. The stream exits the heat exchanger 78 at −58° F. and 142 psia in a vapor and liquid phase in line 80. The phases are separated in the phase separator vessel 82, wherein a light fuel gas is removed as a vapor phase in the overhead line 84. This light fuel gas has a composition of; carbon dioxide 71.6%, carbon monoxide 14.6%, hydrogen 8.7%, and methane 3.6%. The light fuel gas in line 84 is directed back through the feed heat exchanger 58 in order to assist in the cooling of the main feed gas stream. The light fuel gas exits the heat exchanger 58 in line 86 at 82° F. and 137 psia. The gas can then be exported as a fuel product or used on-site for plant power, such as compression requirements, if needed for a low pressure feed gas.

The liquid phase which is separated in the phase separator vessel 82 is removed as a liquid bottom stream in line 88 and immediately expanded to a lower pressure and temperature in valve 90. The stream exits the valve 90 at −72° F. and 80 psia. The stream consists almost entirely of carbon dioxide and has a composition of; carbon dioxide 98.8%, carbon monoxide 0.3% and ethane 0.5%. This carbon dioxide bottom stream is split into two streams 92 and 94. Approximately 4% of the total stream flow is directed through line 92 as a slipstream for utilization as refrigerant in the methanol heat exchanger 98 which cools a downstream carbon dioxide and methanol stream in order to separate such components. The carbon dioxide stream exits the exchanger 98 in line 100. The major portion of the carbon dioxide stream from line 88 is directed through line 94 and comprises approximately 96% of the total flow. This stream in line 94 passes through the carbon dioxide heat exchanger 78 in order to cool the overhead stream from the absorber column 68. The stream exits the exchanger 78 in line 96 at −20° F. and 75 psia. It is joined by the minor stream in line 100 before being expanded in expander turbine 102 to a pressure of 40 psia and −70° F. in line 104. The combined streams in line 104 are then utilized to provide additional cooling of the overhead stream 74 from the absorber column 68 in the carbon dioxide heat exchanger 78. This double expansion in valve 90 and expander 102 constitutes the energy efficient auto-refrigeration which is an important aspect of the present invention. It allows for the important separation of a light fuel gas from the major carbon dioxide stream without the use of outside energy for the separation and specifically for the refrigeration duty required for such separation.

The rewarmed carbon dioxide stream in line 106 is then directed to the carbon dioxide-sulfur stripping column 108. In the stripping column 108, substantially pure carbon dioxide is introduced by line 106 into the base of the column 108, while sulfur-containing methanol from the absorber column 68 is introduced into the top of the stripper column 108 in line 110. The methanol and sulfur stream is sprayed from the top of the column over the ascending carbon dioxide stream. The carbon dioxide strips the sulfur-containing gases from the methanol and exits the overhead of the column in line 112. The sulfur-stripped methanol is removed from the bottom of the column 108 in line 114. This bottom stream has a composition of; methanol 91.6%, carbon dioxide 4.5% and water 3.9%. The stream in line 114 is in the liquid phase and is readily pumped in pump 116, which directs the stream for sulfur absorption in column 68 in which the methanol is delivered to the column in line 72. A small slipstream from pump 116 is passed through line 118 for recycle to the upstream portion of the process in line 56 for water removal. This allows for a cyclic utilization of the methanol with minimum makeup requirements for the methanol absorbent while removing net water.

The overhead stream from the stripping column 108 in line 112 has a composition of; carbon dioxide 98%, sulfur-containing gases 0.4% and methanol 0.36%. This overhead stream in line 112 is combined with a small residual carbon dioxide gas stream in line 120 from the methanol dehydration portion of the cycle and the combined carbon dioxide-containing gases in line 122 are cooled in the methanol heat exchanger 98 in order to separate out residual methanol from the gas stream. The gas stream exits the methanol heat exchanger 98 at $-57°$ F. and 30 psia. The two phase stream is introduced into a phase separator vessel 124, wherein liquid phase methanol is recovered as a bottom stream in line 126 and the carbon dioxide and sulfur-containing gas stream, as a vapor phase, is removed as an overhead in line 128. The recovered methanol in line 126 can be recycled to the methanol makeup line 67 and introduced into the process along with any required makeup methanol from outside the process.

The carbon dioxide and sulfur-containing gases in line 128, which are now free of light fuel components and the methanol absorbent, are then directed back through the feed heat exchanger 58 in order to recover residual refrigeration and to assist in the cooling of the feed off-gas directed through the exchanger 58 in line 36. The rewarmed carbon dioxide and sulfur-containing gases in line 130 exit the system as a carbon dioxide product which can be recycled, as is, to various synthetic fuel production processes, specifically those processes which can tolerate sulfur components, or the product in line 130 is available for further sulfur treatment and export to pipeline and distant enhanced oil recovery operations.

The dehydration cycle for the feed off-gas in line 36 and in line 60 produces a methanol and water liquid stream in line 64 which is removed as a liquid phase from the phase separator vessel 62. It is important to recover the methanol and minor amounts of carbon dioxide which are entrained in this stream. Therefore, the stream is expanded in valve 65 to recover cooling or refrigeration potential. The stream emanates from the valve at $-45°$ F. and 37 psia. The stream is then directed countercurrently back through the feed heat exchanger 58 to assist in the cooling of the feed off-gas in line 36. The methanol and water stream now in line 132 is at 82° F. and 32 psia. At this temperature and pressure, it is possible to remove the minor portion of carbon dioxide which has become entrained in the stream as a vapor phase from the methanol and water liquid phase of the stream. To effect this recovery, the stream in line 132 is introduced into the degassing phase separator vessel 134. An essentially pure, residual carbon dioxide vapor phase is removed as an overhead in line 120 and is combined with the carbon dioxide and sulfurcontaining gas stream in line 112. The degassed methanol and water stream is removed as a bottom liquid phase in line 136 and a portion is recycled through a reboiler unit 140 in order to assist the separating operation of the degassing phase separator vessel 134.

The carbon dioxide-free methanol and water stream in line 136 is then introduced into a methanol recovery column 138. Water is removed from the methanol recovery column 138 as a liquid bottom phase in line 142. A portion of the water is recycled through a reboiler unit 143 in order to provide reboil in the lower portion of the column. The methanol is recovered as the overhead stream in line 144 from the top of the column 138. A portion of the methanol is recycled to the column through refluxing cycle 145 wherein a cold water heat exchanger is used to provide a cool reflux to the overhead of the column 138. The recovered product methanol, now free of water, is pumped through pump 146 back to the upstream portion of the process in order to recycle additional methanol to the process. A stream of methanol is delivered through line 148 to the dehydrated feed off-gas in line 66 for methanol makeup. The remaining portion of this recovered methanol is combined with sulfur-stripped methanol in line 118 from column 108 and the combined streams in line 56 are introduced into the feed off-gas in line 36 for dehydration duty.

As can be seen from this description, the process offers an integrated method for the recovery of a light fuel gas and a valuable carbon dioxide product from the off-gas of a synthetic fuel production process. This is achieved in a low energy manner in which all necessary cooling is performed by ambient cold water heat exchange and predominently by the auto-refrigeration available from expanding the pressurized feed and process streams. The separation is performed by the contact of the off-gas feed stream with methanol in at least three major contact points, including; a dehydration step for the removal of water from the off-gas, a sulfur absorption step in which methanol removes the sulfur-containing gases from the off-gas in order to simplify the removal of a light fuel gas which is free of sulfur components, and finally a stripping contact of the fuel component-free carbon dioxide with the methanol in order to make sulfur-free methanol available for reuse and recycle in the process as a physical absorbent and in order to recover the sulfur-containing gases in the carbon dioxide stream wherein such components can be adequately disposed of in an environmentally acceptable manner or further treated for removal such as feed to a Claus plant. A unique feature of the present invention is embodied in this use of a portion of the off-gas and specifically the carbon dioxide gas stream to purify and regenerate the methanol physical solvent absorbent for further duty within the process. The process achieves a low energy separation because of the auto-refrigeration which is effected by the Joule-Thompson effect and the fact that the solvent is regenerated by the carbon dioxide stream which is processed itself. This provides for a low total power requirement of 1.07 kw-hr/lb mole of feed gas. A small amount of low pressure steam, about 250 BTU/lb mole of feed gas, is required for water removal in the methanol recovery cycle. This provides a total energy requirement of approximately 11,000 BTU/lb mole of feed gas.

A preferred embodiment of the present invention has been described above, but it is understood that various modifications can be made to the invention without deviating from its scope. Exemplary of such is the optional use of initial compression and the number of stages of the compression required, the inclusion of a lean oil absorption system depending on whether the feed gas contains butane and higher hydrocarbons or the particular recycle scheme of the methanol recovery subcycle. Therefore, the scope of the invention should not be limited by this specific disclosure but should be ascertained from the claims which are set forth below.

We claim:

1. A process for the separation of an off-gas from a fuel production process containing carbon dioxide, sulfur-containing gases and lower hydrocarbons by separating said off-gas into an essentially sulfur-free, light fuel gas and a sulfur-containing carbon dioxide gas, comprising the steps of:
   (a) drying a pressurized feed off-gas containing carbon dioxide, sulfur gases and lower hydrocarbons;
   (b) contacting the dry off-gas with a stream of methanol in an absorption column to remove essentially all of the sulfur-containing gases from the off-gas and absorb them in said methanol in which the essentially sulfur-free off-gas is removed as an overhead stream of said column and the sulfur-containing methanol is removed as a bottom stream from said column;
   (c) cooling said overhead stream to partial condensation to phase separate an essentially sulfur-free light fuel gas for export and a predominantly carbon dioxide-containing stream;
   (d) expanding said carbon dioxide-containing stream to provide refrigeration for the cooling and separation of the overhead stream of step (c);
   (e) contacting said sulfur-containing methanol bottom stream of step (b) with said expanded carbon dioxide-containing stream of step (d) in a stripper column to strip essentially all of the sulfur-containing gases from said methanol stream and reabsorb them in said carbon dioxide stream in which essentially sulfur-free methanol is removed as a bottom stream for recycle to the upstream portion of the process and a sulfur-containing carbon dioxide stream is removed as an overhead stream from said column for recycle to the synthetic fuel production process or export.

2. A process for the separation of an off-gas from a fuel production process containing carbon dioxide, sulfur-containing gases and lower hydrocarbons by separating said off-gas into an essentially sulfur-free, light fuel gas and a sulfur-containing carbon dioxide gas, comprising the steps of:
   (a) introducing a stream of methanol into a pressurized feed off-gas containing carbon dioxide, sulfur gases and lower hydrocarbons;
   (b) cooling the methanol-containing feed off-gas against process product streams in a heat exchanger to condense any water contained in said off-gas;
   (c) separating said off-gas into a dry, overhead off-gas stream and a substantially carbon dioxide-free water and methanol bottom stream in a phase separator;
   (d) contacting the dry off-gas with a second stream of methanol in an absorption column to remove essentially all of the sulfur-containing gases from the off-gas and absorb them in said methanol in which the essentially sulfur-free off-gas is removed as an overhead stream of said column and the sulfur-containing methanol is removed as a bottom stream from said column;
   (e) cooling said overhead stream to partial condensation to phase separate an essentially sulfur-free light fuel gas for export and a predominantly carbon dioxide-containing stream;
   (f) expanding said carbon dioxide-containing stream to provide refrigeration for the cooling and separation of the overhead stream of step (e);
   (g) contacting said sulfur-containing methanol bottom stream of step (d) with said expanded carbon dioxide-containing stream of step (f) in a stripper column to strip essentially all of the sulfur-containing gases from said methanol stream and reabsorb them in said carbon dioxide stream in which essentially sulfur-free methanol is removed as a bottom stream for recycle to the upstream portion of the process and a sulfur-containing carbon dioxide stream is removed as an overhead stream from said column for recycle to the synthetic fuel production process or export.

3. The invention of claim 2 wherein the carbon dioxide-containing stream of step (e) is initially expanded to provide refrigeration and is then split into a slipstream which cools the sulfur-containing carbon dioxide stream of step (g) by heat exchange, and a remaining stream which initially cools the overhead stream of step (d), wherein both the slipstream and the remaining stream are recombined after cooling duty and are expanded through an expander turbine to provide refrigeration for additional cooling by heat exchange of the overhead stream of step (d);

4. The invention of claim 3 wherein the sulfurcontaining carbon dioxide stream from said stripper column is cooled to remove residual methanol from said stream.

5. The invention of claims 2 or 4 wherein the sulfur-containing methanol stream from said absorption column is expanded to provide refrigeration for the top of said column by heat exchange.

6. The invention of claim 5 wherein said water and methanol stream of step (c) is phase separated to remove residual carbon dioxide and then introduced into a separator column to remove water as a waste stream and recycle essentially water-free methanol to the process.

7. The invention of claim 6 wherein said residual carbon dioxide is introduced into the overhead stream of said stripper column to be recycled to a synthetic fuel production process or to export.

8. The invention of claim 7 wherein the water and methanol stream of step (c) is expanded to provide refrigeration to cool the feed off-gas in the heat exchanger of step (b).

9. The invention of claims 1 or 2 wherein a low pressure off-gas from a synthetic fuels production process is initially compressed and aftercooled to increase its pressure and to remove water and heavy hydrocarbons therefrom before processing for separation into an essentially sulfur-free, light fuel gas and a sulfur-containing carbon dioxide gas.

10. The invention of claims 1 or 2 wherein the pressurized off-gas is contacted with a lean oil to remove butane and higher hydrocarbons from the off-gas before the introduction of methanol into the off-gas.

11. The invention of claim 10 wherein the lean oil from the butane removal step is regenerated and recycled using a steam stripping operation.

12. The invention of claim 9 wherein the pressurized off-gas is contacted with a lean oil to remove butane and higher hydrocarbons from the off-gas before the introduction of methanol into the off-gas.

13. The invention of claim 12 wherein the lean oil from the butane removal step is regenerated and recycled using a steam stripping operation.

14. The invention of claim 1 or 2 wherein the off-gas is derived from an oil shale retorting process.

15. The invention of claim 1 or 2 wherein the off-gas is derived from a coal gasification process.

16. The invention of claim 1 or 2 wherein the off-gas is derived from an oxygen fireflooding process.

17. The invention of claim 1 or 2 wherein the off-gas is derived from a carbon dioxide miscible flood enhanced oil recovery process.

* * * * *